(12) United States Patent
Calange

(10) Patent No.: US 6,193,404 B1
(45) Date of Patent: Feb. 27, 2001

(54) DIPPING MIXER

(75) Inventor: Yves Calange, Gourdon (FR)

(73) Assignee: Robot-Coupe (S.N.C.), Montceau-les-Mines (FR)

( * ) Notice: Subject to any disclaimer, the term of this patent is extended or adjusted under 35 U.S.C. 154(b) by 0 days.

(21) Appl. No.: 09/254,610

(22) PCT Filed: Jul. 10, 1998

(86) PCT No.: PCT/FR98/01500

§ 371 Date: Apr. 28, 1999

§ 102(e) Date: Apr. 28, 1999

(87) PCT Pub. No.: WO99/03388

PCT Pub. Date: Jan. 28, 1999

(30) Foreign Application Priority Data

Jul. 16, 1997 (FR) .................................................. 97 09012
Oct. 29, 1997 (FR) .................................................. 97 13551

(51) Int. Cl.[7] ...................................................... B01F 7/00
(52) U.S. Cl. .......................................... 366/129; 366/331
(58) Field of Search ..................... 366/129, 343, 366/342, 331, 197; 15/23, 28; 403/13, 14, 19

(56) References Cited

U.S. PATENT DOCUMENTS

| | | | |
|---|---|---|---|
| 2,275,247 | * | 3/1942 | Cavanagh .................................. 15/23 |
| 4,405,998 | * | 9/1983 | Brison ................................... 366/129 |
| 4,850,669 | * | 7/1989 | Rebordosa ............................. 366/343 |
| 5,099,536 | * | 3/1992 | Hirabayashi .............................. 15/28 |
| 5,289,604 | * | 3/1994 | Kressner .................................. 15/28 |
| 5,366,286 | * | 11/1994 | Ruttimann ............................ 366/331 |
| 5,368,384 | * | 11/1994 | Duncan et al. ....................... 366/129 |
| 5,567,047 | * | 10/1996 | Fritsch .................................. 366/129 |
| 5,810,472 | * | 9/1998 | Penaranda et al. ................... 366/129 |
| 5,863,118 | * | 1/1999 | Ackels et al. ......................... 366/129 |

FOREIGN PATENT DOCUMENTS

| | | | |
|---|---|---|---|
| 629800 | * | 4/1963 | (BE) . |
| 315830 | * | 10/1956 | (CH) . |
| 1 429 176 | * | 10/1968 | (DE) . |
| 3306989 | * | 8/1984 | (DE) ..................................... 366/129 |
| 3307023 | * | 8/1984 | (DE) ..................................... 366/129 |
| 1 467 108 | * | 1/1967 | (FR) . |
| 2 553 278 | * | 4/1985 | (FR) . |

* cited by examiner

Primary Examiner—Tony G. Soohoo
(74) Attorney, Agent, or Firm—Duane, Morris & Heckscher LLP

(57) ABSTRACT

A portable electrical appliance or hand-held blender for processing food. According to the invention, the appliance comprises a case having a handle, the case including an electric motor rotating a first end of a shaft included in a fixed tube, a tool being secured to the shaft, and wherein a removable endpiece secured to the tool is mounted on the second end of the tube. The blender is applicable particularly to catering.

8 Claims, 7 Drawing Sheets

DIPPING MIXER

The present invention relates to a portable electric appliance or hand-held blender particularly, but not exclusively, for preparing food.

BACKGROUND OF THE INVENTION

Such appliances are well known and are in widespread use. They comprise a case having a handle and containing an electric motor which rotates a first end of a shaft included in a fixed tube or sleeve, with the tool being mounted at the other end of the shaft. The tool is driven at high speed and is plunged into food that is to be prepared, where the tool chops, blends, emulsifies, etc. the food.

The problem which arises with that type of appliance is essentially a problem of hygiene. Given the presence of an electric motor, it is not possible to clean the appliance properly, particularly in a dishwasher, and in particular it is not possible to sterilize the leading end carrying the tool that is to come into contact with successive preparations that are generally different. Unfortunately, the tool rotating at high speed acts as a pump providing upward suction. This means that in spite of the precautions taken concerning sealing, a small portion of the blended and chopped liquids rises inside the tube where it can often putrefy under the action of bacteria.

OBJECTS AND SUMMARY OF THE INVENTION

An object of the present invention is to mitigate that drawback and to enable a hand-held blender to be provided that is capable of being used on a catering scale, together with the necessary hygiene qualities.

According to the invention, in the hand-held blender comprising a case having a handle, said case including an electric motor for rotating a first end of a shaft included in a tube secured to the case, with a tool being mounted at the second end of said shaft, a removable endpiece secured to the tool is mounted on the free end of the tube, the tool is mounted so as to be removable inside the endpiece.

It is thus possible to remove the endpiece for thorough cleaning or sterilization. It is thus possible not only to remove the endpiece, but also to dismantle the tool for more thorough cleaning or maintenance, in particular of the bearing that lies behind the tool.

According to yet another characteristic of the invention, the base of the motor unit is sealed, with the necessary air inlet and outlet being situated in the top portion thereof to establish an appropriate flow of cooling air. The sealing of the bottom portion prevents food penetrating into the motor unit during normal use and thus prevents bacteria forming inside it, it also reduces the risk of an electrical accident in the event of the appliance being dropped since the ventilation orifices are high, and it prevents carbon dust from the brushes penetrating into the food that is being prepared.

The electrical power supply circuit preferably includes a "loss-of-voltage" card. In the event of the thermal protection contacts opening (e.g. because the motor is overheating), then the loss-of-voltage card is no longer powered and prevents the motor being restarted until the user has acted deliberately on the on/off switch of the appliance. User safety is thus improved.

In certain particular applications where heat is applied continuously to the receptacle, in which the food is raised to a temperature that may be as high as 100° C., a large increase in temperature has been observed at the bearing of the bell, the heat being transmitted to the bearing by the metal shaft of the tool. Since the bearing is embedded in plastics material, which is a thermal insulator, it is difficult to evacuate the heat transmitted by the tool. This phenomenon is accentuated by the heating specific to the bearing due to the shaft of the tool rotating at a speed that may be as great as several thousand revolutions per second. This gives rise to a serious risk of overheating.

In a preferred embodiment, a heat bridge is established by means of a heat-conducting ring mounted between the bell and the bearing. In this way, heat can be evacuated under good conditions. The bearing is thus in thermal contact with the bell whose large surface area makes it possible to evacuate heat from the bearing.

BRIEF DESCRIPTION OF THE DRAWINGS

Other characteristics and advantages of the present invention appear from the following description of particular embodiments, given purely as non-limiting examples, and with reference to the figures, in which.

MORE DETAILED DESCRIPTION

Figure 1:
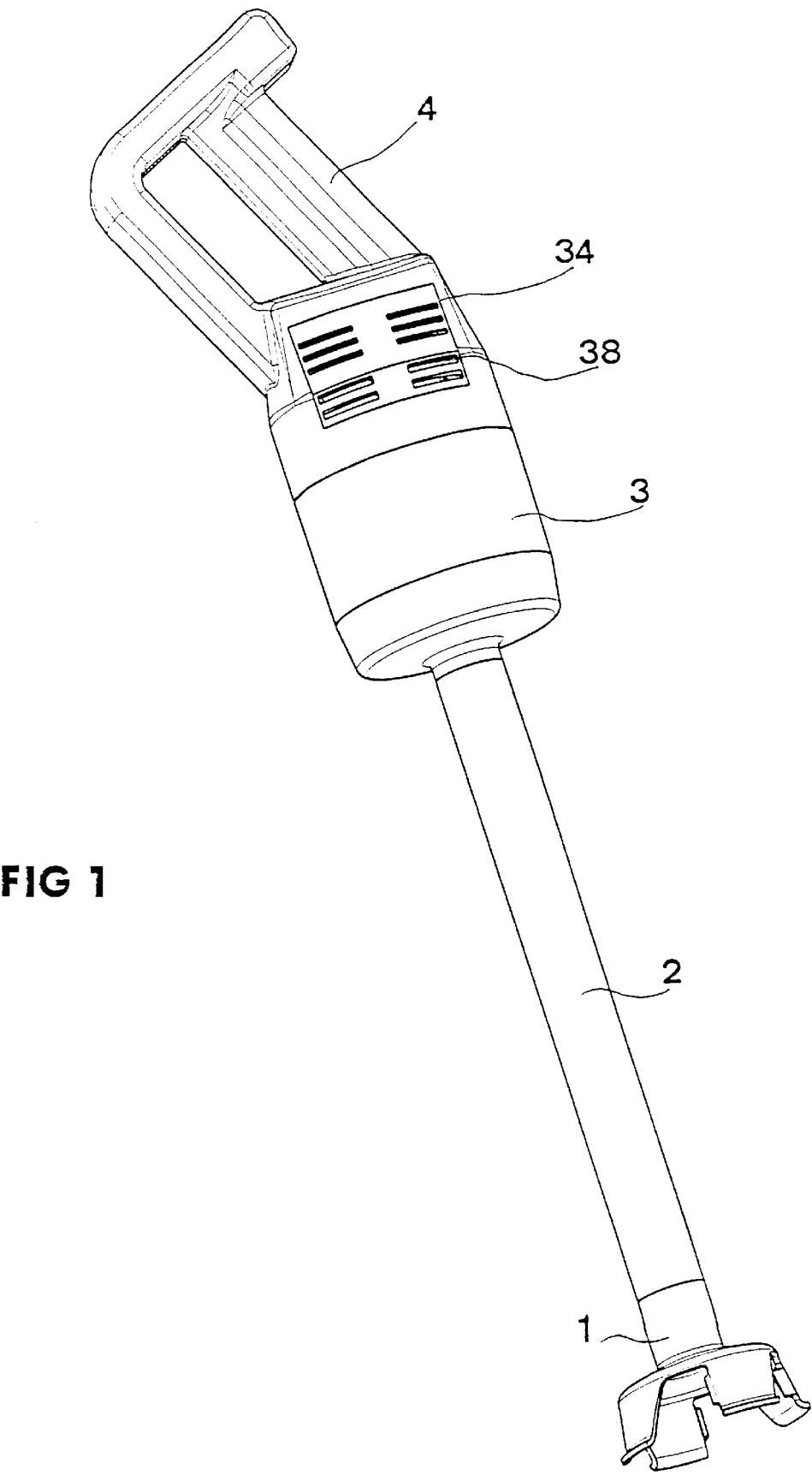
FIG. 1 is a perspective view of a blender of the invention.

In FIG. 1, it can be seen that the blender comprises from the bottom upwards: a removable endpiece 1 fixed to a tube or sleeve 2, the tube 2 being secured to a case 3 which includes an electric motor (not shown) together with electrical connection means for connecting the motor to a source of electricity including a thermal fuse and a loss-of-voltage card. The top of the case 3 has a handle 4 integrally formed thereon, said handle 4 optionally including a switch for controlling the operation of the motor. In FIG. 1, the blender is shown in its operating state.

Figure 2:
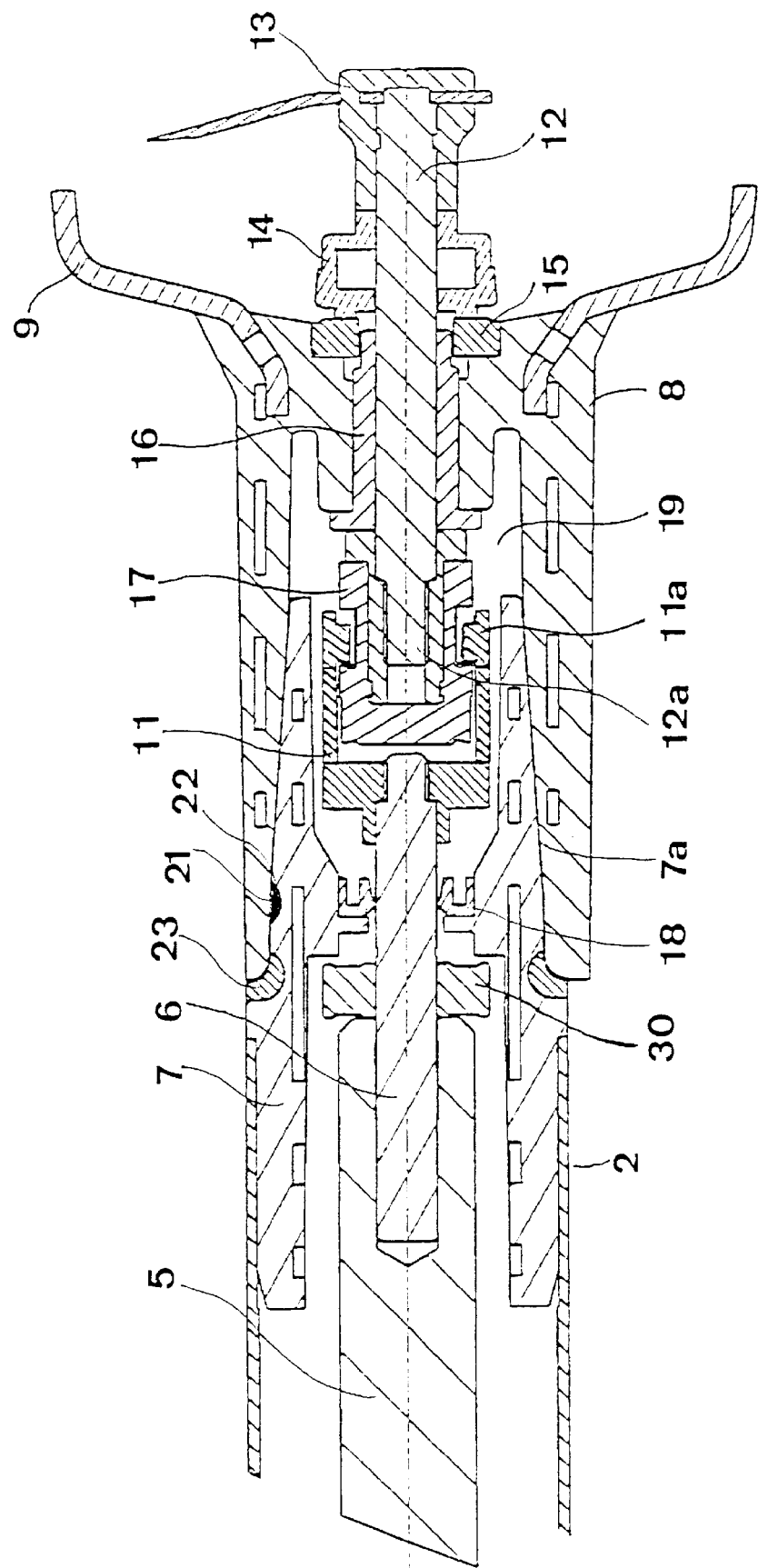
FIG. 2 is a section view on a vertical plane through the bottom portion of the tube and the endpiece in the working position.
Figure 3:
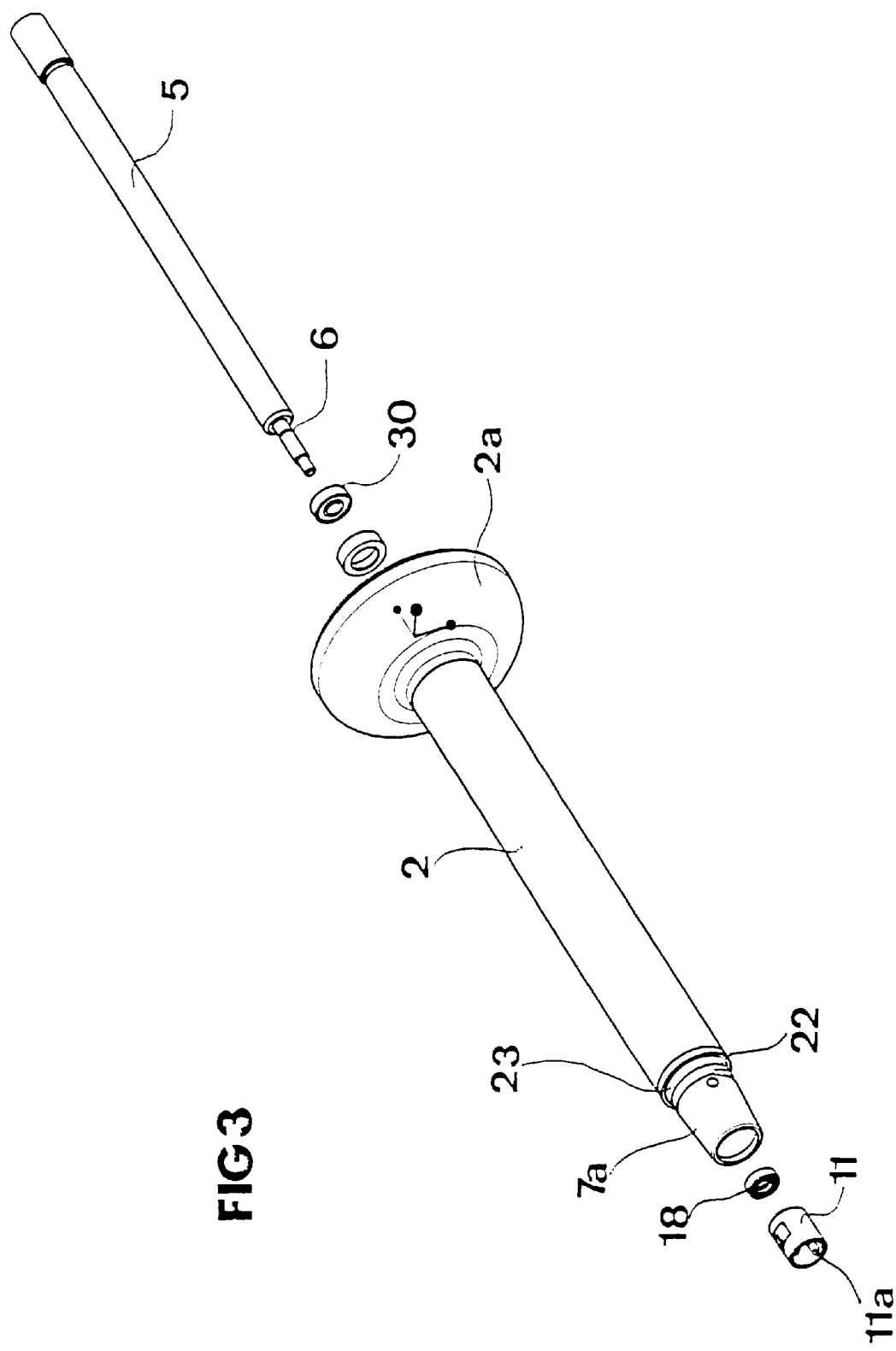
FIG. 3 is an exploded view of the top portion of the tube.
Figure 4:
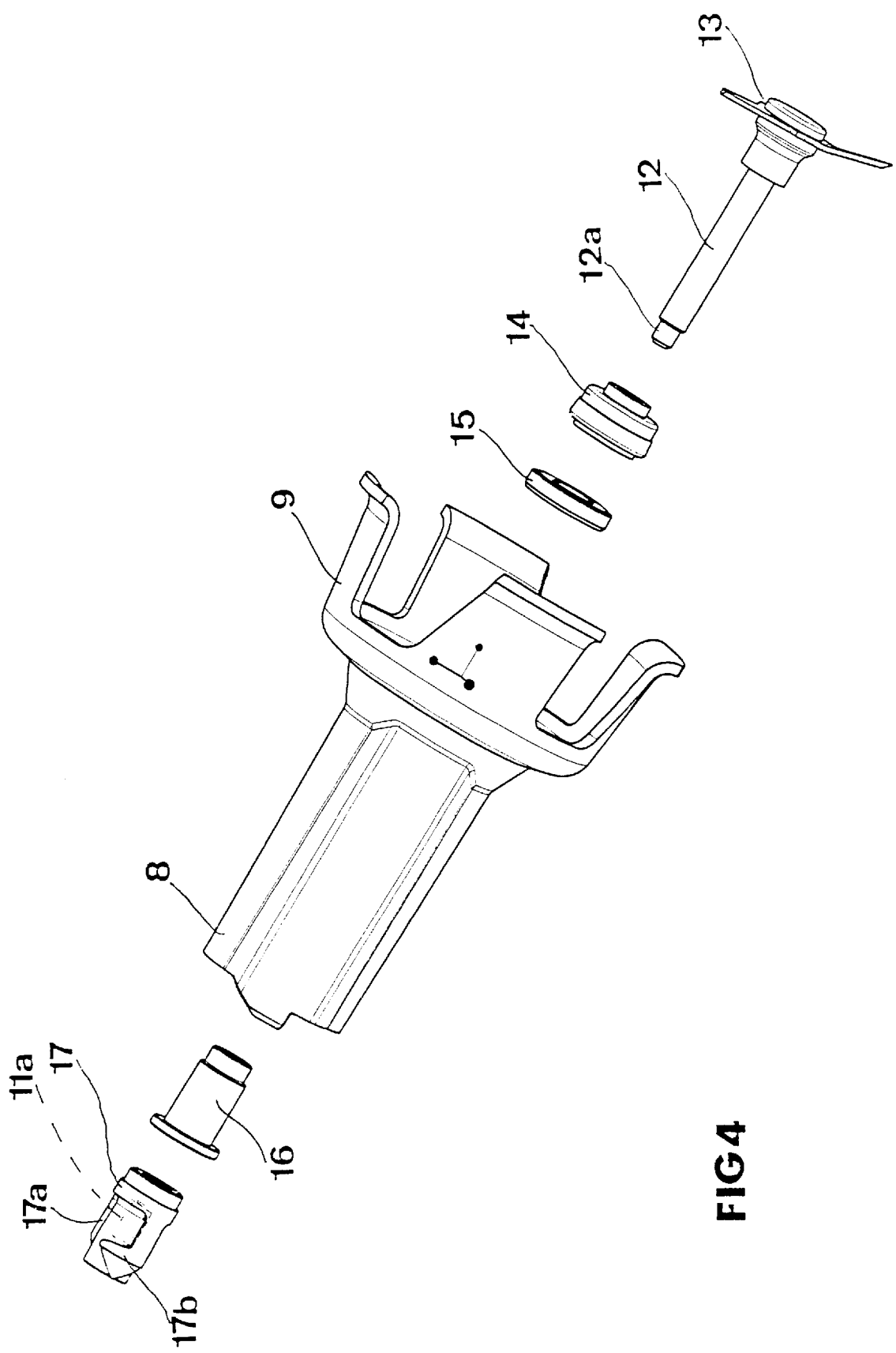
FIG. 4 is an exploded view of the bottom portion of the blender.

A first embodiment is shown in FIGS. 2, 3, and 4.

FIG. 2 is a section through the leading end of the blender comprising the leading end of the tube 2 in which there extends a drive shaft 5 whose top end (not shown) is mechanically connected to the outlet shaft of the motor. Naturally, the shaft 5 is elongate and of sufficient length to ensure that the case 3 is remote from the tool which is designed to operate in fluids, and generally at relatively high temperature. Naturally, like the case, the handle must at all times be kept remote from and outside the preparation.

A coupling piece 7 for coupling with the removable endpiece 1 is mounted at the bottom end of the tube 2. The leading end of the piece 7 (on the right-hand side of the figure) has an assembly portion 7a for assembly with a piece 8 whose inside face 8a corresponds to the surface 7a which, in the example shown, is conical. The piece 8 has studs 21 at its top end (only one of which is shown in the figure)

capable of engaging in a groove 22 in the piece 7 to form a bayonet fastening. A static gasket 23 is disposed between the pieces 7 and 8. A bell-shaped metal guard 9 is secured to the piece 8 so as to prevent the tool 13 from touching the bottom or the walls of the receptacle and so as to allow the tool to operate by the processed matter being reflected on its walls.

In the axial portion, there can be seen an extender 6 secured to the bottom portion of the shaft 5 and extending it. The extender 6 has its leading end inserted in a drive piece screwed into the extender 6, and constituting a drive cage 11 surrounding a drive hub 17.

In FIG. 3, going from right to left, there can be seen the drive shaft 5 and the extender 6, a ball bearing 30 and a ring 30a, the tube 2 having an assembly cup 2a for sealed assembly on the motor housing 3. The bottom portion of the tube 2 carries the endpiece and its conical portion 7a. Below that there is a lip gasket 18 and the drive cage 11 which is secured to the shaft 5 by the extender 6.

Similarly, FIG. 4 shows, from top to bottom, the drive hub 17, a cylindrical bearing 16, e.g. made of graphite, the sleeve 8 terminated by the bell 9, and a sealing piece 15 having a low coefficient of friction against which a resilient bellows 14 bears after assembly. Inside the assembly there is mounted a shaft 12, 12a for the tool 13.

These elements are shown assembled together in FIG. 2. Inside the drive cage 11 there is mounted, via the hub 17, the smaller diameter end 12a of the shaft 12 whose other end carries the tool 13 which, in the example shown, has three blades. A first level of sealing is provided by the bellows 14, e.g. made of neoprene, having one side bearing against a surface of the piece 15 which is made of ceramic, for example. Because of the resilience of the bellows 14, the tool can move axially through several tenths of a millimeter, as explained below.

Thereafter, the shaft 12 is received in the cylindrical bearing 16. The drive hub 17 is secured by screw engagement to the trailing portion of the shaft 12 and is surrounded by the drive cage 11 secured to the endpiece 6. This rotary endpiece is itself protected against upwardly-travelling liquid by the lip gasket 18, and it rotates in the ball bearing 30.

When rotating in the food preparation, the tool 13 exerts a centrifugal pumping effect which tends to suck liquid into the inside of the tube 2 giving rise to the drawbacks mentioned above. In the appliance of the invention, this problem is solved firstly by the presence of means providing improved sealing, and secondly by the presence of a decompression chamber 19 of appropriate volume formed inside the endpiece around the drive members for driving the tool.

Sealing is improved by allowing a small amount of axial clearance to the tool which, as mentioned above, presses against the bellows 14 while it is in rotation. To this end, and as can be seen at the top of FIG. 4, the drive hub 17 has ribs 17a while the cage 11 has internally projecting portions 11a (FIG. 3). The projecting portions 11a which bear against the ribs 17a move over a camming surface 17b of the hub 17 so as to attract the shaft 12 and the tool towards the extender 6, thereby producing the desired compression of the bellows gasket 14 as soon as the motor is switched on.

FIG. 3 shows the elements as described above, and in particular the endpiece 7 with its bayonet fastening groove 22.

The bottom portion of FIG. 4 shows clearly that the tool mounted inside the endpiece 1 can easily be dismounted by rotating the tool shaft 12 to disengage the projecting portions 11a from the cam surface 17b, and then rotating the sleeve 8 so that the studs or teeth 21 of the sleeve face the inlets to the grooves 22.

The endpiece can thus be dismantled very quickly by rotating it through one-fourth of a turn, thereby releasing the teeth 21 from the groove 22, after which traction is applied to the endpiece 1, thereby disconnecting the piece 11 from the piece 17 and disengaging the piece 8 from the cone 7a. The tool can then be dismantled by causing the piece 17 to rotate counterclockwise, thereby unscrewing the threaded portion 12a.

Figure 5:
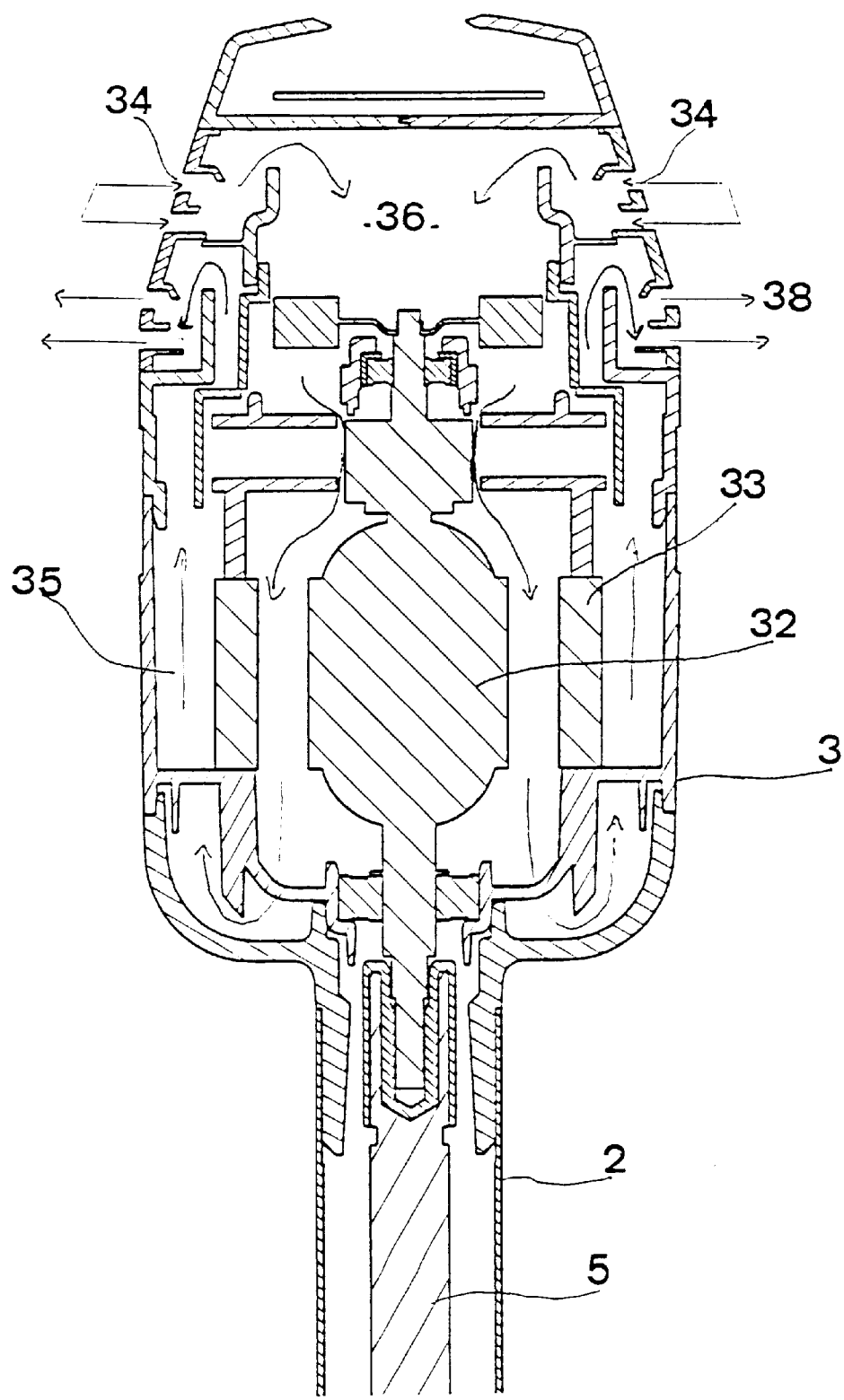
FIG. 5 is a view showing cooling air circulation within the motor cover.

FIG. 5 shows the top portion of the blender. As mentioned above, it is desirable for it to comply with sealing conditions that are as complete as possible. That is to say the case 3 must be completely sealed at its bottom end so as to avoid any splashes reaching the motor. Unfortunately, splashes are common because of the rotation of the tool. Thus, according to another characteristic of the invention, the air inlet and outlet for cooling the motor take place via orifices 34 and 38 situated at the top of the case 3. Air flow through the motor follows the path shown by the arrows (not referenced). The inlet orifices 34 communicate with a chamber 36 located above the motor when in its working position with the tool pointing downwards. Air flows downwards between the rotor 32 and the stator 33. Thereafter it rises via a cylindrical chamber 35 to escape via the orifices 38.

Figure 6:
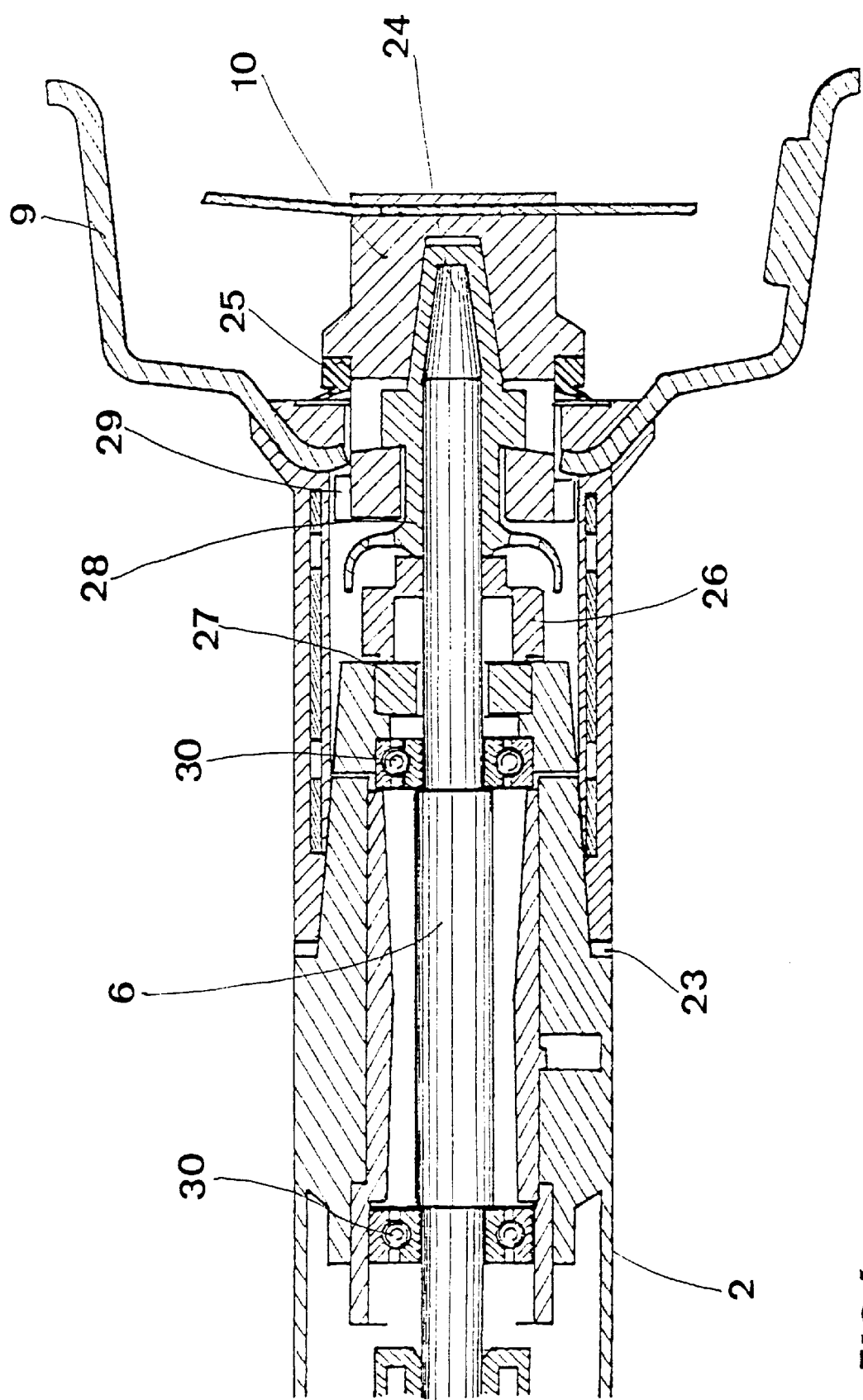
FIG. 6 is a view showing a variant mount for the tool inside the endpiece.

FIG. 6 shows a variant of the tool and dismountable endpiece assembly as described above. In this embodiment, the drive cage 10 is held captive in the bell-shaped endpiece 9 via a collar 29 having clearance which gives it two degrees of freedom, respectively axially and transversely. The hub 28 secured to the drive shaft 6 terminates in the leading portion thereof (to the right in FIG. 6) by a centering cone 24 for the drive cage 10. A lip gasket 25 is mounted between the drive cage 10 and the bottom surface of the endpiece 1. The hub and the cage have a ramp system enabling the drive cage 11 to be pulled against the hub 28 so as to compress the lip gasket 25 and thereby provide a first level of sealing. A second level of sealing is obtained by a fitting 26 which rotates while the tool is being driven against a face of a piece 27 which is made of ceramic, for example. The drive shaft 6 rotates inside the endpiece via two ball bearings 30. It is secured to the drive shaft of the motor as before. After the appliance has been used, this solution makes it possible to remove the endpiece and the tool for cleaning purposes.

The removable endpiece 8, mechanically connected to the tube 2 and including motion transmission means, makes it possible to cover the metal pieces in such a manner as to present a surface that has no zones that might retain food.

Figure 7:
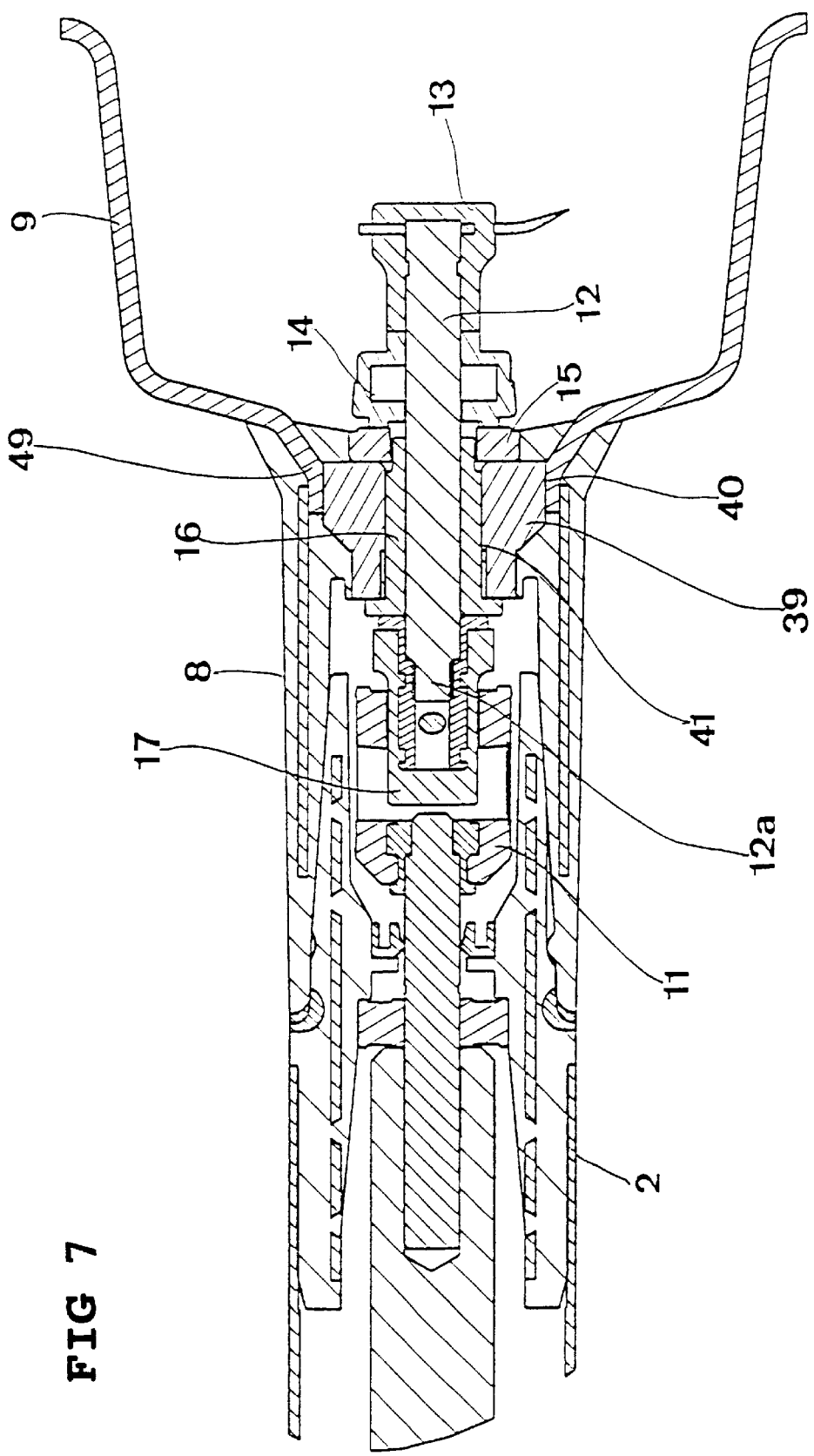
FIG. 7 is a section through the bottom portion of a hand-held blender with a removable endpiece that includes a thermal bridge.

In FIG. 7, the shaft 12 of the tool rotates in a cylindrical bearing 16. One end of the shaft 12 carries the tool 13 which, in the example shown, is a knife with three blades. The second end 12a of the shaft 12 is mounted inside the drive cage 11 by means of a drive hub 17. Sealing is provided, starting from the tool 13, by the bellows 14, e.g. of neoprene, with one side bearing against a surface of the piece 15 having a low coefficient of friction and constituted by graphite, for example.

When the appliance is in operation, rotation of the shaft 12 in the bearing 16 can give rise to an increase in temperature which cannot be dissipated when the bearing 16 is embedded in plastic, and thus thermally insulated from the bell 9, and this runs the risk of damaging the appliance.

In accordance with the invention, a heat conducting ring 39, e.g. made of stainless steel, is inserted between the bearing 16 and the bell 9. The ring is generally frustoconical in shape with its outer surface 40 in contact with the top portion 49 of the bell 9, and with its inner orifice 41 being a tight fit around the bearing 16 over a major fraction of its length.

The ring 39 establishes a heat bridge between the bearing 16 and the bell 9, thereby enabling heat to be dissipated to the outside of the appliance.

Naturally, numerous variants can be provided, particularly by substituting equivalent technical means, without thereby going beyond the ambit of the invention.

What is claimed is:

1. A hand held blender comprising:

a first shaft disposed in a tube, the first shaft and the tube having corresponding first and second ends, an electric motor coupled to the first end of the first shaft, a case housing the electric motor, the case being secured to the first end of the tube, an endpiece removably mounted to the second end of the tube, the endpiece including a coupling piece having teeth, the second end of the tube having an assembly piece surmounted by a groove, the groove being engageable by the teeth of the coupling piece, a static gasket interposed between the coupling piece and the assembly piece, and a tool removably coupled to the second end of the first shaft.

2. A blender according to claim 1, wherein the tool is mounted to a second shaft and the first shaft includes an extender driving a drive cage secured to the extender, and co-operating with a drive hub secured to the second shaft.

3. A blender according to claim 2, wherein the drive hub includes camming surfaces and the drive cage has internal projections engaged in the drive hub and bearing against said camming surfaces to axially displace the second shaft and the tool towards the extender.

4. A blender according to claim 2, wherein the drive cage is held captive in the endpiece by a collar with clearance giving it two degrees of freedom, respectively axially and transversely.

5. A blender according to claim 2, wherein the extender is mounted to rotate by means of a bearing and is sealed by a lip gasket.

6. A hand-held blender according to claim 5, further comprising a heat-conducting ring mounted between the bearing and the endpiece.

7. A blender according to claim 1, further comprising a rotary bellows gasket secured to the second shaft, an annular piece having a low coefficient of friction, secured to said endpiece, said bellows gasket being compressible to bear against said annular piece; and, a decompression chamber.

8. A blender according to claim 1, wherein the case includes top and bottom ends and is provided at its top end with inlet and outlet orifices for air, with the bottom end of the case being sealed.

* * * * *